United States Patent Office 2,853,507
Patented Sept. 23, 1958

2,853,507

PROCESS FOR THE PREPARATION OF ALKYL PHOSPHONATES

Charles J. Smith, Jr., Grand Island, N. Y., assignor to Olin Mathieson Chemical Corporation, a corporation of Virginia No Drawing. Application February 4, 1953
Serial No. 335,174

8 Claims. (Cl. 260—461)

My invention relates to a method for the preparation of phosphonates of the formula $(RO)(R'O)P(O)R''$ in which R, R' and R'' are alkyl radicals.

It is old in the art to prepare compounds falling within the scope of the foregoing formula by reacting a di-alkyl hydrogen phosphite with an alkali metal which has been dispersed in a partially hydrogenated terphenyl, thereby forming an alkali metal salt of the dialkyl hydrogen phosphite, and thereafter reacting such salt with an alkyl halide. The steps can be represented by the following reactions:

(1) $2(RO)(R'O)P(O)H + 2M$
$= 2(RO)(R'O)P(O)M + H_2$ (2) $2(RO)(R'O)P(O)M + 2R''X$
$= 2MX + 2(RO)(R'O)P(O)(R'')$ in which R, R' and R'' are alkyl radicals, M is an alkali metal atom and X is a halogen atom.

More specifically, metallic sodium has been dispersed in a partially hydrogenated terphenyl and the dispersion then contacted under reaction conditions with di-isopropyl hydrogen phosphite, thereby forming di-isopropyl sodium phosphite in solution and evolving hydrogen. The solution containing the di-isopropyl sodium phosphite has then been contacted under reaction conditions with methyl chloride, thereby forming the compound $(i\text{-}PrO)_2P(O)CH_3$ in solution and also sodium chloride, which remains dispersed in the solution. This mixture has then been passed to a distilling column which has been operated under a high vacuum, the desired product being removed as overhead and a dispersion of sodium chloride in the partially hydrogenated terphenyl being removed as bottoms from the column.

The prior art procedure involving the use of partially hydrogenated terphenyl is subject to certain serious drawbacks. In the first place, the hydrogen formed in the reaction of Equation 1 frequently causes excessive foaming which necessitates slowing down the throughput of given apparatus or even completely halting the operation of such apparatus. Moreover, the desired product cannot be adequately separated from the partially hydrogenated terphenyl. Thus, in order for the desired product to be completely removed from the solvent in the vacuum distilling column, it is essential that the liquid at the bottom of the column be boiling. However, the boiling point of partially hydrogenated terphenyl at an absolute pressure of about 10 mm. of mercury or any other low absolute pressure that can economically be obtained in practice is so high that if the liquid at the bottom of the column is boiled excessive decomposition of the product occurs. As a result, when using partially hydrogenated terphenyl as a solvent it is necessary that the temperature of the liquid leaving the bottom of the column be substantially below the boiling point of the pure solvent in order that excessive product decomposition will not take place. In practice, optimum vacuum distilling requires that the liquid leaving the bottom of the column in order to meet these requirements contain about 3.5 percent of product, based upon the amount of liquid leaving the bottom of the column. This amounts to about 13 percent of the product produced in the process and is much too high for satisfactory commercial operation. Also, difficulty is encountered in that the salt remains dispersed in the solvent stream entering the vacuum distilling tower, resulting in decreased yields of the desired product in the vacuum distillation operation and in a need for washing the effluent from the bottom of the vacuum distilling tower in order that the solvent can again be used in the process. Removal of the salt from the solvent by washing is difficult.

In attempting to find a solvent which represents an improvement over partially hydrogenated terphenyl when used in the general procedure described above, it is insufficient that such solvent not result in excessive foaming, be one from which the desired product can be conveniently removed by means of vacuum distillation and be one from which the salt formed can be easily removed. In addition to these requirements, a new solvent in order for it to provide an improved overall operation must be one which does not react with the alkali metal and must be one in which the di-alkyl sodium phosphite forms a dispersion which is stable against settling.

In accordance with my present invention, I have discovered that petroleum distillates having an initial boiling point within the range from about 450 to about 550° F., when used as solvents in the process, provide definite advantage in that they do not react with the alkali metal, do not result in excessive foaming and provide for proper dispersion of the di-alkyl sodium phosphite. At the same time, when such distillates are used, the desired product can be substantially completely stripped from such distillates by means of vacuum distillation and the alkali metal halide formed in the process precipitates from the solvent so that such salt can be readily removed by filtration and a liquid substantialy free from salt introduced into the vacuum distilling tower.

The following example illustrates in detail an embodiment falling within the scope of my invention. In the example, the parts and percentages are by weight, unless otherwise specified.

*Example*

265 parts of a 15 percent by weight dispersion of metallic sodium in a straight run petroleum distillate boiling within the range 500 to 600° F. and having a temperature of about 110° C. is added to a solution composed of 256 parts of di-isopropyl hydrogen phosphite in 970 parts of the petroleum distillate which has been preheated to about 65° C., the rate of addition of the dispersion being such that the temperature of the reaction mixture is held at about 90° C. The reaction mixture is then cooled to 85° C. and 127 parts of gaseous methyl chloride is bubbled in over a period of 25 minutes while the reaction temperature is maintained within the range 75–90° C. Sodium chloride in very finely divided form precipitates as the reaction proceeds. The reaction mixture is then cooled to room temperature and the sodium chloride is separated by filtration. The filtrate is then introduced into a vacuum distilling column operated at an absolute pressure of 5 mm. of mercury. When the vacuum distilling column is so operated, the desired product in substantially pure form is taken off as overhead when the vapor temperature is about 70° C.

Various modifications can be made in the procedure just described to provide other embodiments which fall within the scope of my invention. Hence, in place of the di-isopropyl hydrogen phosphite there can be used other di-alkyl hydrogen phosphites, preferably those containing not more than 8 carbon atoms, for example, dimethyl hydrogen phosphite, di-ethyl hydrogen phosphite, di-n-butyl hydrogen phosphite, di-2-ethylhexyl hydrogen phosphite, and so forth. Potassium can also be used in place of sodium. The reaction conditions used in forming the alkali metal salt of the di-alkyl hydrogen phosphite are substantially those which have heretofore been used in the prior art processes involving the use of partially hydrogenated terphenyl as the solvent, the di-alkyl hydrogen phosphite and alkali metal preferably being employed in their stoichiometric proportions.

Other petroleum distillates can be used instead of the particular one employed in the specific example. Thus, there can be used mineral seal oil, a distillate of 36–39° A. P. I. gravity, 250–260° F. minimum flash point, 480–540° F. initial boiling point and 600–700° F. end point. Alternatively, there can be used an absorption oil boiling within the range 482–630° F. and having a 37° A. P. I. gravity or straight-run gas oil boiling within the range 440–800° F. and having a 30° A. P. I. gravity.

In place of the methyl chloride, there can be used other alkyl halides, preferably those having from 1 to 4 carbon atoms, such as ethyl chloride, n-propyl bromide, n-butyl chloride, and so forth. Here again, the reaction conditions employed are essentially those of the prior art, a 10 to 50 percent stoichiometric excess of the alkyl halide preferably being used in order to insure complete conversion of the alkali metal salt to the desired product and a reaction temperature of about 70 to about 110° C. preferably being used. The degree of vacuum employed in recovering the product is not critical, absolute pressures within the range from about 5 to about 50 mm. of mercury being preferred.

I claim:

1. A method for the preparation of a compound of the generic formula $(RO)(R'O)P(O)(R'')$ which comprises reacting a compound of the formula $$(RO)(R'O)P(O)H$$

with an alkali metal while the alkali metal is dispersed in a petroleum distillate to form an alkali metal salt of the compound of the formula $(RO)(R'O)P(O)H$, reacting the alkali metal salt while dissolved in the petroleum distillate with a compound of the formula $R''X$ to form a mixture consisting essentially of a solution of the compound of the formula $(RO)(R'O)P(O)(R'')$ in the petroleum distillate and precipitating a salt of the alkali metal and X, separating the salt of the alkali metal and X from said mixture, and subjecting said mixture to vacuum distillation and removing a compound of the formula $(RO)(R'O)P(O)(R'')$ as overhead and the petroleum distillate as bottoms, R, R' and R'' being lower alkyl radicals, the alkali metal being selected from the group consisting of sodium and potassium, the petroleum distillate being one having an initial boiling point within the range from about 450 to about 550° F., and X being selected from the group consisting of chlorine and bromine.

2. A method according to claim 1 in which X is chlorine.

3. A method according to claim 1 in which the alkali metal is sodium.

4. A method according to claim 1 in which the reaction between the compound R''X and the alkali metal salt of the compound of the formula $(RO)(R'O)P(O)H$ is carried out at a temperature within the range from about 70 to about 110° C.

5. A method according to claim 1 in which the sum of the carbon atoms in R and R' does not exceed 8 and in which the number of carbon atoms in R'' does not exceed 4.

6. A method according to claim 1 in which the petroleum distillate is straight run and has a boiling range of about 500 to 600° F.

7. A method according to claim 1 in which R and R' are isopropyl and in which R'' is methyl.

8. A method according to claim 1 in which R and R' are isopropyl, in which R'' is methyl, in which X is chlorine and in which the alkali metal is sodium.

No references cited.